(12) United States Patent
Martich

(10) Patent No.: US 6,729,902 B2
(45) Date of Patent: May 4, 2004

(54) CABLE IDENTIFICATION SYSTEM FOR A 110 IDC TERMINAL BLOCK

(75) Inventor: Mark E. Martich, Barrington, RI (US)

(73) Assignee: Ortronics, Inc., New London, CT (US)

( * ) Notice: Subject to any disclaimer, the term of this patent is extended or adjusted under 35 U.S.C. 154(b) by 0 days.

(21) Appl. No.: 10/144,405

(22) Filed: May 13, 2002

(65) Prior Publication Data

US 2003/0068919 A1 Apr. 10, 2003

Related U.S. Application Data

(60) Provisional application No. 60/327,920, filed on Oct. 9, 2001.

(51) Int. Cl.[7] .................................................. H01R 3/00
(52) U.S. Cl. ........................ 439/488; 439/491; 439/719
(58) Field of Search ................................ 439/488, 491, 439/532, 718, 719

(56) References Cited

U.S. PATENT DOCUMENTS

| | | | | |
|---|---|---|---|---|
| 5,051,870 A | * | 9/1991 | Companion | 361/773 |
| 5,312,270 A | * | 5/1994 | Siemon et al. | 439/532 |
| 5,352,136 A | * | 10/1994 | Chen | 439/719 |
| 5,555,153 A | | 9/1996 | Frederiksen et al. | 361/719 |
| 5,613,874 A | * | 3/1997 | Orlando et al. | 439/491 |
| 5,720,632 A | * | 2/1998 | Viklund | 439/719 |
| 6,257,937 B1 | * | 7/2001 | Baker et al. | 439/718 |
| 6,302,699 B1 | * | 10/2001 | Conorich et al. | 439/49 |

* cited by examiner

Primary Examiner—Hae Moon Hyeon
(74) Attorney, Agent, or Firm—McCarter & English LLP

(57) ABSTRACT

The present disclosure provides an identification system for signal carrying media connected with a terminal block. The system includes an elongated member adapted having a plurality of locations for communicating information relating to the media and a retaining device having further location for communication information thereon for securing the elongated member to the terminal block.

13 Claims, 4 Drawing Sheets

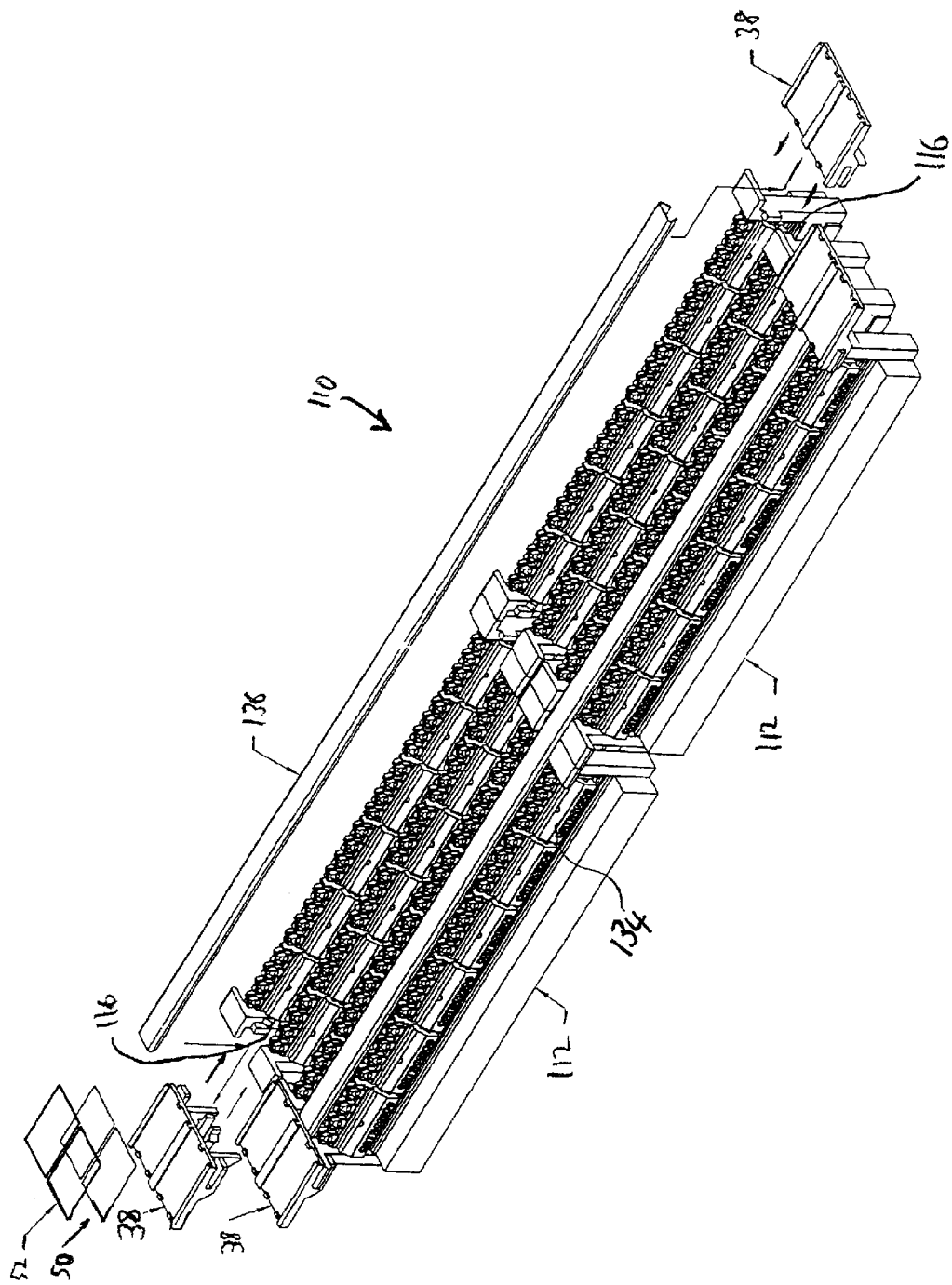

CABLE IDENTIFICATION SYSTEM FOR A 110 IDC TERMINAL BLOCK

CROSS-REFERENCE TO RELATED APPLICATION(S)

The subject application claims the benefit of U.S. Provisional Application Ser. No. 60/327,920 filed Oct. 9, 2001, the disclosure of which is herein incorporated by reference.

BACKGROUND OF THE DISCLOSURE

1. Technical Field

The present disclosure relates to devices for interfacing with high frequency data transfer media and, more particularly, to a terminal block having a system and method for identifying the transfer media associated therewith.

2. Background Art

Standard commercially available, terminal blocks, including the commonly used 110-style block, are typically used to provide an interconnection between electronic equipment and work area outlets for electrically conductive data transfer media (hereinafter also referred to as "cable"), such as unshielded twisted pair cable ("UTP"). UTP is a popular and widely used type of data transfer media for either voice or data communications. In fact, UTP is rapidly becoming the de facto standard for Local Area Networks ("LANs") and other in-building voice and data communications applications.

The termination is actually a joining of two cables with the block acting as a transfer point. The block is dielectric and does not have metallic contacts. However, the block provides a plurality of termination locations (hereinafter also referred to as "terminals") which have engagements for securing the individual signal-carrying elements (hereinafter also referred to as "wires") from a plurality of cables. The connection between the terminated cable and a second cable is typically facilitated by terminal clips having electrically conductive contacts and a set of engagements for the second cable wires. The block and clips arrangement (collectively referred to as the "terminal block" or "punchdown system") allows interchangeable interconnection of the wires, thus making wiring and rewiring the block easier. The block and clips are configured to have corresponding fittings so that the clips can be non-permanently affixed to the terminals on the block.

Typical applications, such as telephone service, for both business and residential sites, require a substantially large amount of cables for connecting incoming and outgoing wires. These cables will be terminated at a plurality of blocks, usually for routing purposes. When dealing with many cables in a situation like this in the field, it is imperative that every cable be labeled or otherwise identified at each termination point.

Referring initially to FIG. 1, which illustrates a prior system of identification for cables connected with a standard block 12 and plurality of terminal clips 22, it is clear that the prior system provides a limited amount of labeling space. Furthermore, the prior system is fitted onto block 12 but not secured. A great deal of time would be wasted by technicians determining cable destinations should the prior system for identifying cables be dislodged.

Also, in view of increasing demands being placed on communication systems (e.g., the implementation of category 6 standards), many new devices and/or methodologies for reducing electrical noise associated with communication equipment are being employed. Some of these improvements may alter the design of the blocks or clips which can, in turn, hamper or possibly inhibit use of the prior system and/or any similar systems.

Consequently, there exists a need for a system and method for identifying cables associated with a terminal block which is more reliable, in that it is secured to the block and not likely to fall off or be accidentally removed, and compatible or adaptable to new devices used in conjunction with the block. These and other objectives are achieved through the advantageous system and method disclosed herein.

SUMMARY OF THE DISCLOSURE

The present disclosure provides an identification system which includes an identification bar and retainer clips for securing the identification bar. The retainer clips may include flags.

Furthermore, the present disclosure is directed to an identification system for signal carrying media associated with a terminal block. The block has a plurality of laterally adjacent rows of terminals for connecting media which also define recessed channels therebetween. The identification system includes an elongated member adapted to be seated within one of the recessed channels and a structure or means for securing the elongated member within the recessed channel.

The elongated member includes a plurality of locations for communicating information relating to the media associated with the terminal block. The information may be communicated by directly writing on the elongated member. Alternatively, an elongated label adapted to fit the elongated member may be slipped under the elongated member (if the elongated member is translucent) prior to being secured on the terminal block. Also, the labels may be made of paper and include adhesive on one side for being adhered to the elongated member. The labels may be preprinted or written on in the field. Preferably, the elongated member includes a planar surface for receiving the labels or any indicia relating to the media associated with the terminal block. Preferably, the elongated member has a substantially planar upper surface and its opposed longitudinal sides are folded down and substantially inward toward each other.

In an embodiment of a system in accordance with the present disclosure, a retaining member having an engagement portion for mechanically engaging the terminal block is used to secure the elongated member. The retaining member may also define a plurality of locations for communicating information, such as information relating to the destination of the media associated with the terminal block. These locations may be on a separate component attachable to the terminal block but preferably are defined on the retaining member. Preferably, the retaining member has slots for securing the labels thereto. The engagement portion may include a latching device for connecting the retaining member with the terminal block and/or a slot for receiving a portion of the terminal block.

The identification system may be made of metal or a dielectric material, such as wood or polymer. The identification system can be advantageously fabricated of extruded, die-cut or injection-molded plastic.

The present disclosure is also directed to a terminal block comprising a dielectric support member including laterally adjacent rows of terminals used to facilitate electrical coupling between cables which define recessed channels therebetween. The terminal block further includes an elongated member with locations for communicating information relating to the cables and a structure or means operatively associated with the terminal block for securing the elongated member in a recessed channel. Preferably, the securing structure or means includes locations for communicating information relating to the cables coupled on the terminal block.

In one embodiment of the aforementioned system, the elongated member is secured by a retaining member having an engagement portion for engaging the terminal block.

The present disclosure is further directed to a method for identifying media associated with a terminal block. The steps in this method include positioning an elongated member within a recessed channel defined on the block, wherein the elongated member defines a plurality of locations for communicating information relating to the media associated with the terminal block, and securing the elongated member in the recessed channel with a retaining member. Preferably, the retaining member is supported in position for securing the elongated member by being attached to the block. The method can also include the step of affixing labels to the elongated member.

These and other unique features of the systems, devices and methods of the present disclosure will become more readily apparent from the following description of the drawings taken in conjunction with the detailed description.

BRIEF DESCRIPTION OF THE DRAWINGS

So that those having ordinary skill in the art to which the present disclosure appertains will more readily understand how to construct and employ the present disclosure, reference may be had to the drawings wherein:

FIG. 4 is an exploded perspective view illustrating another embodiment of an identification system constructed in accordance with the present disclosure for identifying media which may be connected with a terminal block, wherein the identification system is shown in conjunction with a standard 110 terminal block without legs.

Figure 1:
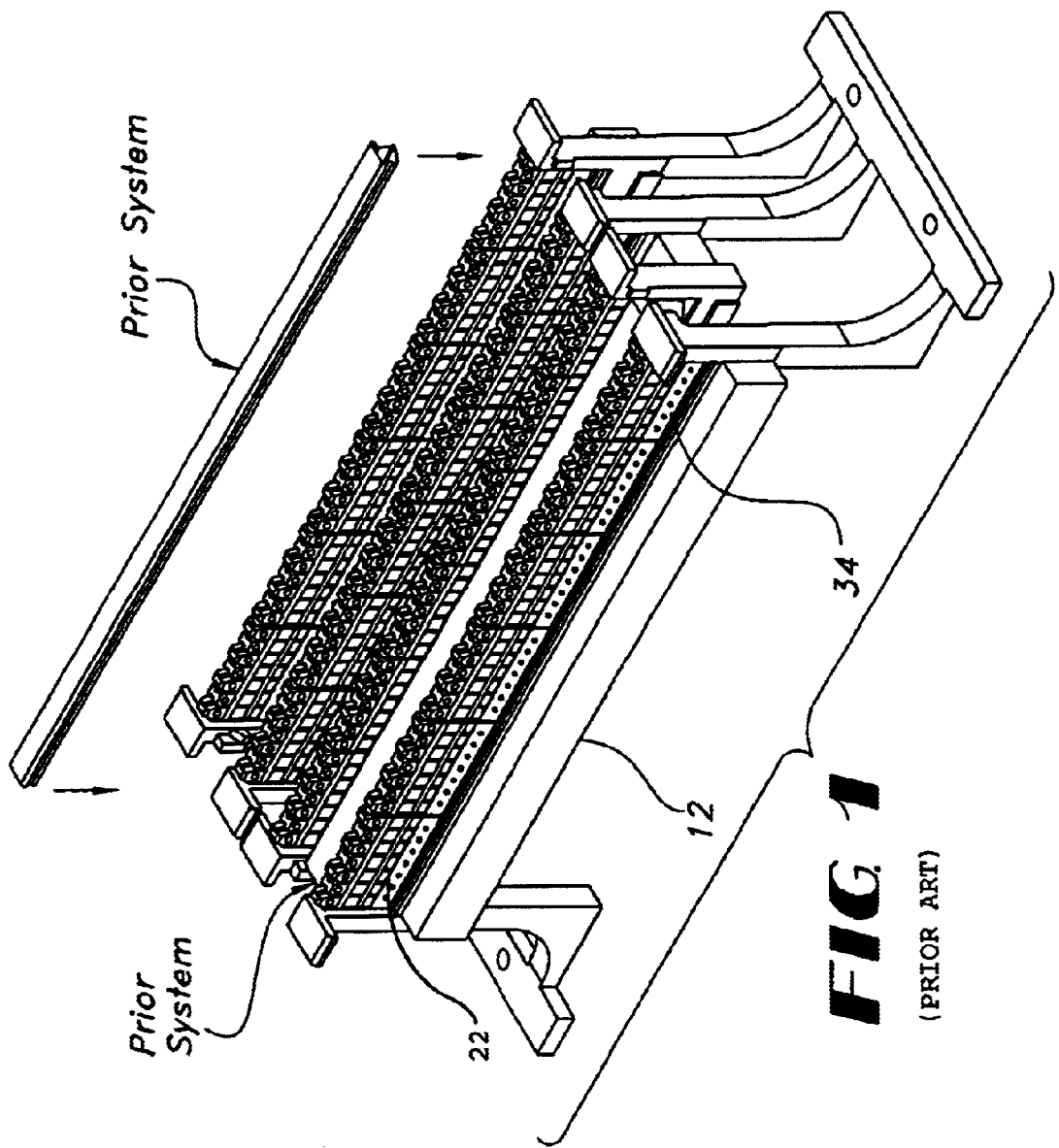
FIG. 1 is an exploded perspective view illustrating a prior art identification bar disposed on a standard 110 terminal block.

These and other features of the system and method of the present disclosure will become more readily apparent to those having ordinary skill in the art from the following detailed description of preferred and exemplary embodiments.

DETAILED DESCRIPTION OF PREFERRED EMBODIMENT(S)

The following detailed description of preferred and/or exemplary embodiments of the present disclosure is intended to be read in the light of, or in context with, the preceding summary and background descriptions. Unless otherwise apparent, or stated, directional references, such as "upper", "lower", "horizontal" and "vertical", are intended to be relative to the orientation of a particular embodiment of the disclosure as shown in the first numbered view of that embodiment. Also, a given reference numeral should be understood to indicate the same or a similar structure when it appears in different figures.

Figure 2:
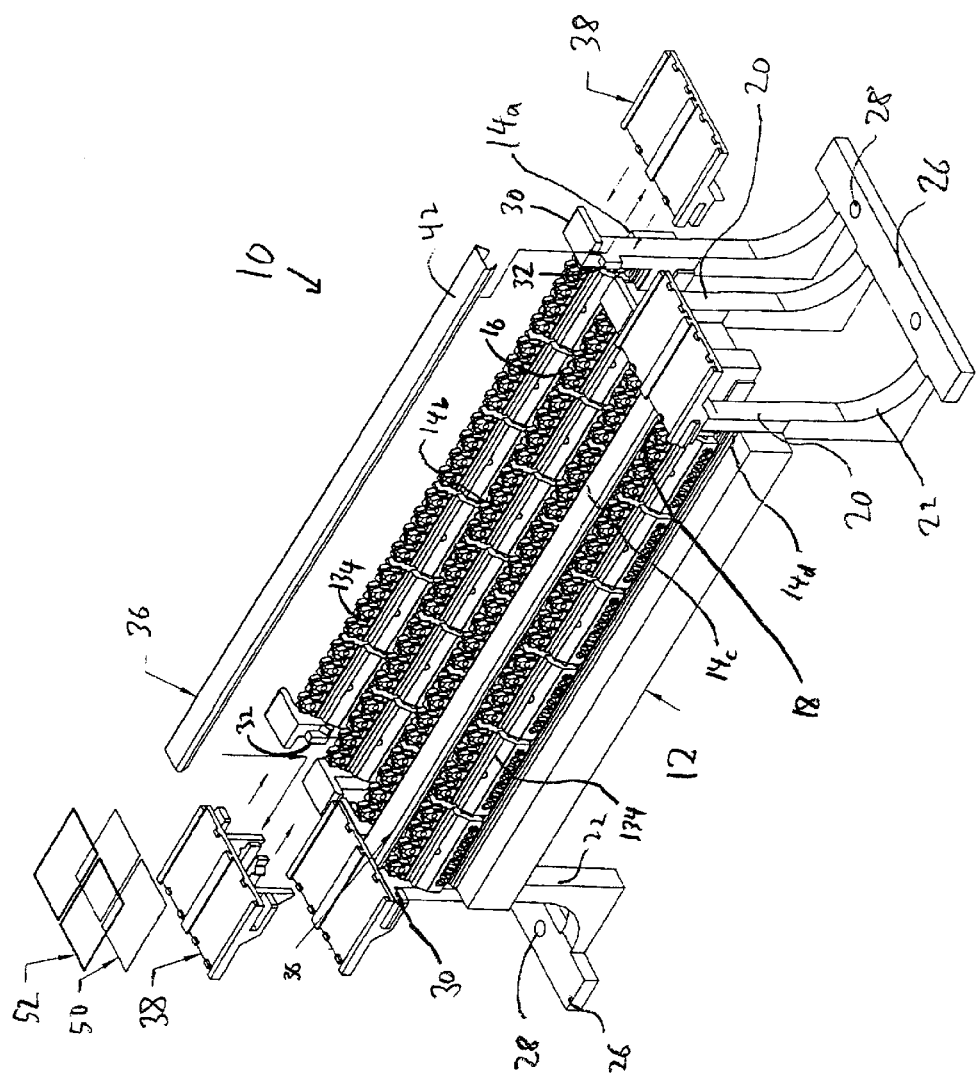
FIG. 2 is an exploded perspective view illustrating an identification system constructed in accordance with the present disclosure for identifying media which may be connected with a terminal block, wherein the identification system is shown in conjunction with a standard 110 terminal block.
Figure 3:
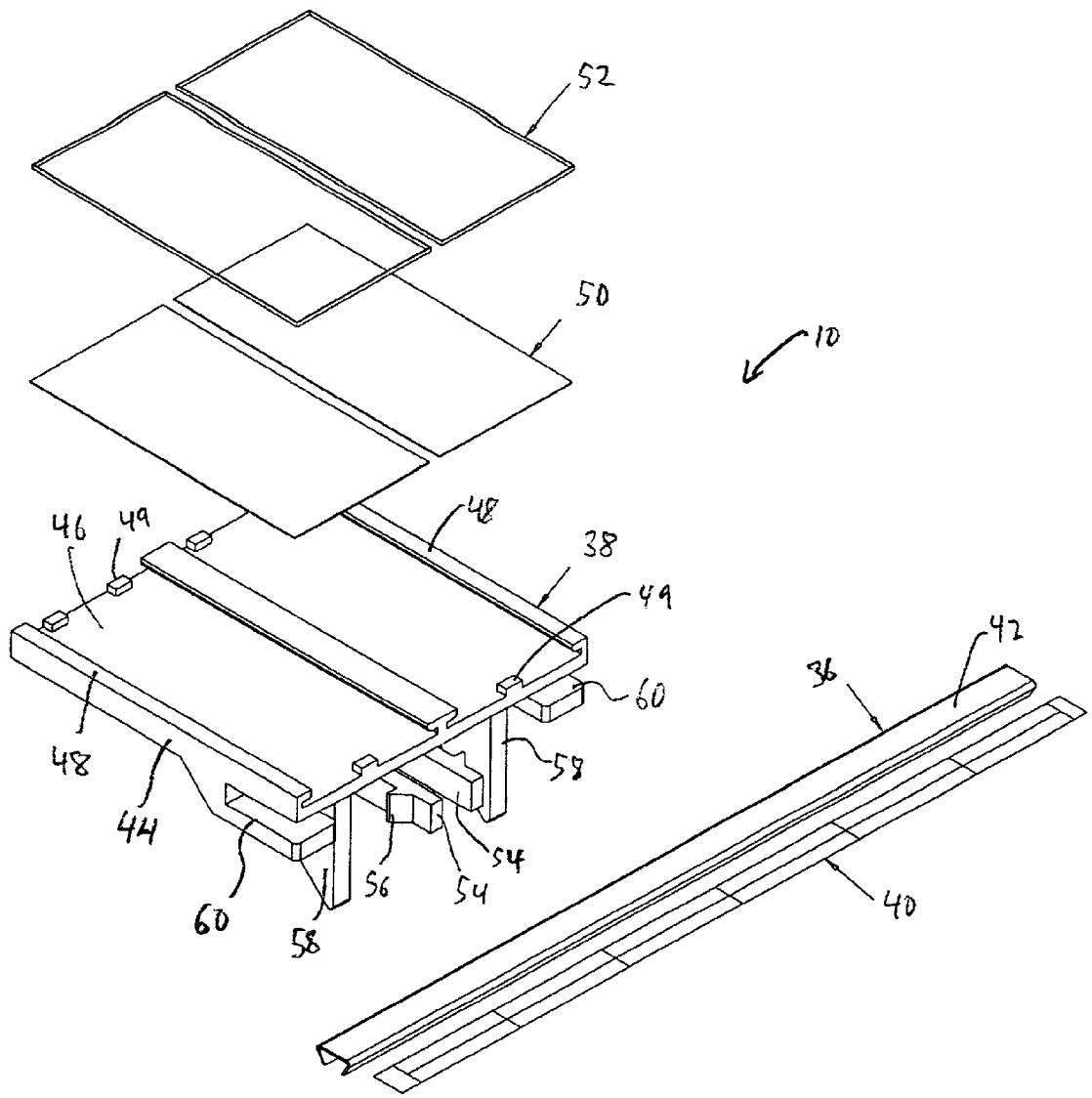
FIG. 3 is an exploded elevated view of the identification system shown in FIG. 2.

Referring now to the drawings, and more particularly to FIGS. 2 and 3 thereof, there is shown an identification system constructed in accordance with the principles of the present disclosure and generally indicated by the reference character 10. Identification system 10 is primarily intended for use in connection with blocks for electrically conductive media, such as, for example, a block conventionally referred to as an AT&T Style 110 Block, which are commonly used in connection with telephone circuitry, data transfer and other electronic applications or systems. As can be particularly seen from FIG. 2, block 12 comprises a plurality of horizontal rows of terminals 14a, 14b, 14c, and 14d. Terminal rows 14a and 14b are laterally spaced with respect to each other so as to form an elongated or longitudinally extending channel 16 therebetween, and similarly, terminal rows 14c and 14d are laterally spaced with respect to each other so as to form an elongated or longitudinally extending channel 18 therebetween. Each row 14a–14d is braced on its longitudinal ends by vertical ribs 20. Six of the eight ribs 20 associated with block 12 are connected at their lower end portion with support legs 22. Support legs 22 include a mounting bar 26 with holes 28 extending therethrough for mounting block 12 with screws, nails, bolts, or via any other fastening means. The upper end portion of each rib 20 includes protuberances 30 which extend outwardly from block 12. The upper end portion also includes protuberances 32 which extend from laterally adjacent ribs 20.

Each one of the rows of terminals 14a–14d is provided with a plurality of longitudinally aligned terminals. As previously mentioned, these terminals provide locations for engaging a plurality of terminal clips. In FIGS. 1–2 and 4, the longitudinally aligned terminals are not visible due to terminal clips being engaged thereon. Terminal clips 34, as illustrated in FIG. 1, are intended to represent standard clips used in the field. The terminal clips 134 depicted in FIGS. 2 and 4 are of a type constructed in accordance with the disclosure of copending, commonly owned, U.S. patent application Ser. No. 10/052,593 to Aekins, et al., filed Jan. 18, 2002, which claims the benefit of U.S. Provisional Application Serial No. 60/288,156 filed May 2, 2001, and which are herein incorporated by reference. Regardless of the type of terminal clip depicted in FIGS. 1–2 and 4, it should be understood that identification system 10 and any other alternative embodiments, either disclosed herein or which may be constructed in accordance the present disclosure, are not intended to be limited by the type of terminal clip, and in fact, are well-suited for use with the types of clips shown, as well as clips of other type and any functionally equivalent devices which are capable of engaging the plurality of longitudinally aligned terminals.

Referring now to FIGS. 2 and 3, identification system 10 includes an elongated member 36 and retaining members 38. Elongated member 36 is dimensioned to fit at least partially within channels 16 and 18, and retaining members 38 are configured to secure elongated member 36 therein. Preferably, retaining members 38 include means for engaging ribs 20. Label 40 may be attached to upper surface 42 of elongated member 36 or slipped underneath prior to installation.

In this embodiment, retaining members 38 includes a body portion 44 with a planar upper surface 46. Preferably, upper surface 46 is substantially planar and includes dual spaced-apart slots 48 and notches 49 for securing a label 50 and protective label cover 52 thereon. Body portion 44 includes central latches 54 having notches 56 defined thereon. Body portion 44 also includes two support beams 58 which extend substantially perpendicularly downward from upper surface 46, and body portion 44 further defines laterally outer slots 60.

As indicated by the arrows in FIG. 2, elongated member 36 is placed in channel 16 and two retaining members 38 are connected with the ribs 20 corresponding to rows 14a and 14b after the media is terminated on block 12 with clips 134. Notches 56 engage the corresponding laterally adjacent protuberances 32 and slots 60 receive at least a portion of protuberances 30, thus securing retaining members 38 to block 12. Also, once retaining members 38 are secured as described above, the distal end of central latches 54 contacts the upper surface 42 of elongated member 36, thus securing elongated member 36 in channel 16. Labels 40 and 50, which may include adhesive strips with removable backings can be disposed onto elongated member 36 and retaining members 38. Labels 40 and 50 may have pre-printed indicia, text or graphics, or have blank surfaces for writing thereon. An already-installed identification system 10 is shown in channel 18.

By comparison with the prior system shown in FIG. 1, it is readily apparent that identification system 10 components provide benefits over the prior system which, among other things, include added locations for identifying the many wires, cables, media, etc. that can be densely associated with block 12. In addition, retaining members 38 also serve a wire-management function in that they contain and hide the media below for improved appearance. Furthermore, when installed, identification system 10 is seated in block 12 more securely than the prior system, thus identification system 10 is less likely to fall off or be accidentally removed.

FIG. 4 illustrates an alternative embodiment constructed in accordance with the present disclosure generally indicated by the reference character 110. In this embodiment, two blocks 112 without support legs are placed end-to-end, as is a standard practice in the field. Elongated member 136 is disposed in channel 116 much like in the previous embodiment. However, channel 116 extends the length of the two blocks 112 and elongated member 136 is elongated to fit channel 116 accordingly.

Preferably, identification system 10 and 110 are fabricated from a suitable dielectric material, such as, for example, a polymer or plastic. However, elongated member 36 and retaining member 38 may be made of wood or metal. Preferably, elongated member 36 or 136 is translucent and shaped, as shown in FIGS. 2 and 4, so that its opposed longitudinal sides are folded-in, thus creating an elongated slot therebetween, which, among other things, provides for a better fit in the channel and a secure location for a label to be positioned prior to installation. Also, elongated member 36 is preferably made of a slightly resilient plastic, while retaining member 38 is preferably made of a more rigid plastic material. Identification system 10 and 110 may be constructed via extrusion, injection molding, die-cut or other conventional techniques. Label covers 52 are preferably clear and may be made of mylar.

Although the disclosed systems, devices and methods have been described with respect to preferred embodiments, it is apparent that modifications and changes can be made thereto without departing from the spirit and scope of the invention as defined by the appended claims.

What is claimed is:

1. An identification system for signal carrying media associated with a terminal block having a plurality of laterally adjacent rows of terminals for connecting media and recessed channels defined therebetween, the system comprising:

(a) an elongated member adapted to be seated within a recessed channel wherein the elongated member defines a plurality of locations for communicating information relating to the media associated with the terminal block; and (b) means operatively associated with the terminal block for securing the elongated member within the recessed channel, said securing means including at least one retaining member having a body portion that defines: (i) an upper surface for receiving a label, (ii) at least one outer engagement slot, and (iii) a deflectable latch mechanism that cooperates with a downwardly extending support beam;

wherein said at least one retaining member is adapted to be latched to said terminal block and to secure said elongate member within the recessed channel; and wherein said upper label-receiving surface defined on said body portion is positioned outside said recessed channel of said terminal block.

2. A system as recited in claim 1, wherein the upper surface of said retaining member defines a plurality of locations for communicating information relating to the media associated with the terminal block.

3. A system as recited in claim 1, wherein the retaining member is fabricated from a dielectric material.

4. A system as recited in claim 1, wherein the retaining member is fabricated from a plastic.

5. A system as recited in claim 1, wherein the upper surface for receiving a label is planar and wherein said planar surface is adapted to receive indicia relating to the media associated with the terminal block.

6. A system as recited in claim 5, wherein the indicia is adhered to the planar surface.

7. A system as recited in claim 1, wherein the elongated member includes a substantially planar upper surface and opposed longitudinal sides folded down and substantially inward.

8. A terminal block with a cable identification system comprising:

(a) a dielectric support member;

(b) a plurality of laterally adjacent rows of terminals defined on the support member, wherein the terminals are used to facilitate electrical coupling between cables;

(c) a plurality of recessed channels defined on the support member by the plurality of laterally adjacent rows;

(d) an elongated member adapted to be seated in a recessed channel, wherein the elongated member defines a plurality of locations for communicating information relating to the cables electrically coupled on the terminal block; and (e) means operatively associated with the terminal block for securing the elongated member in a recessed channel, said securing means including at least one retaining member having a body portion that defines: (i) an upper surface for receiving a label, (ii) at least one outer engagement slot, and (iii) a deflectable latch mechanism that cooperates with a downwardly extending beam;

wherein said at least one retaining member is adapted to be detachably latched to said terminal block and to secure said elongate member within the recessed channel; and wherein said upper label-receiving surface defined on said body portion is positioned outside said recessed channel of said terminal block.

9. A terminal block as recited in claim 8, wherein said means operatively associated with the terminal block for securing the elongated member within a recessed channel includes a plurality of locations for communicating information relating to the media associated with the terminal block.

10. A terminal block as recited in claim 9, wherein the locations include slots for securing labels thereon.

11. A terminal block as recited in claim 8, wherein the elongated member is fabricated of a dielectric material.

12. A method for identifying media associated with a terminal block, comprising the steps of:

(a) positioning an elongated member within a recessed channel defined by longitudinally aligned terminal rows on the terminal block, wherein the elongated member defines a plurality of locations for communicating information relating to the media associated with the terminal block; and (b) detachably securing first and second retaining members at opposite ends of said terminal block, said first and second retaining members each having a body portion that defines: (i) an upper surface for receiving a label, (ii) at least one outer engagement slot, and (iii) a deflectable latch mechanism that cooperates with a downwardly extending support beam, and wherein said upper label-receiving surface defined on said body portion is positioned outside said recessed channel of said terminal block; and (c) securing the elongated member within the recessed channel by attaching said elongated member to said first and second retaining members.

13. A method according to claim 12, further comprising the step of:

(d) affixing labels to the elongated member.

* * * * *